(12) United States Patent
Rieck

(10) Patent No.: US 7,730,817 B2
(45) Date of Patent: Jun. 8, 2010

(54) APPARATUS FOR CUTTING DUCTILE MATERIALS AND A METHOD OF OPERATING THE APPARATUS

(75) Inventor: Andreas Rieck, Arboldswil (CH)

(73) Assignee: Buss, AG (CH)

( * ) Notice: Subject to any disclaimer, the term of this patent is extended or adjusted under 35 U.S.C. 154(b) by 293 days.

(21) Appl. No.: 11/179,846

(22) Filed: Jul. 12, 2005

(65) Prior Publication Data

US 2006/0016307 A1 Jan. 26, 2006

(30) Foreign Application Priority Data

Jul. 21, 2004 (CH) .................................... 1232/04

(51) Int. Cl.
  *B26D 5/10* (2006.01)
  *B26D 1/00* (2006.01)
  *A21C 11/10* (2006.01)
  *B29C 47/00* (2006.01)

(52) U.S. Cl. ............................. 83/245; 83/240; 83/363; 83/932; 425/311; 425/313; 425/518; 426/516; 264/143; 264/145

(58) Field of Classification Search .................. 83/212, 83/13, 215, 217, 240, 245, 932, 465, 324, 83/675, 591, 612, 402, 202, 213, 218, 363, 83/469; 425/313, 516, 518, 311, 382.2, 465, 425/381, 316, 67, 190, 196, 464, 291, 310; 426/516, 518, 862, 863, 678; 264/167, 143, 264/145, 141

See application file for complete search history.

(56) References Cited

U.S. PATENT DOCUMENTS

| | | | | |
|---|---|---|---|---|
| 2,401,236 A | * | 5/1946 | Fielitz | ......................... 425/313 |
| 2,550,146 A | * | 4/1951 | Gillich et al. | ................. 83/354 |
| 3,025,564 A | * | 3/1962 | Voigt | .......................... 264/142 |
| 3,029,466 A | | 4/1962 | Guill | |
| 3,083,408 A | * | 4/1963 | Bichl | ........................... 425/89 |
| 3,464,086 A | * | 9/1969 | Hasten et al. | ................ 425/142 |
| 3,780,406 A | * | 12/1973 | Cupler et al. | ................ 29/26 A |
| 3,874,835 A | | 4/1975 | Rossiter et al. | |
| 3,948,133 A | * | 4/1976 | Diehm et al. | .................. 83/556 |
| 3,956,954 A | * | 5/1976 | Edwards | ....................... 83/285 |
| 4,196,561 A | * | 4/1980 | Kruse | .......................... 53/300 |
| 4,462,470 A | * | 7/1984 | Alexander et al. | ............ 175/72 |

(Continued)

FOREIGN PATENT DOCUMENTS

DE 1 077 190 3/1960

(Continued)

*Primary Examiner*—Ghassem Alie
(74) *Attorney, Agent, or Firm*—Maginot Moore Beck LLP

(57) ABSTRACT

A cutting apparatus for ductile materials comprises a nozzle having a number of outlet openings separated from each other by separator webs. Next to the nozzle, a rotating cutting tool is provided, having a plurality of cutting knives for cutting off the strands of material discharged through the outlet openings of the nozzle. Each separator web is at least as wide as a cutting knife. For performing a cutting operation, the cutting tool is intermittently rotated. Between two cutting operations, the cutting tool is stopped, whereby its knives remain in a rest position behind the separator webs. For the next cutting operation, the cutting tool is rotated by such an amount that its cutting knives move from a position behind a first separator web to the next adjacent separator web.

6 Claims, 2 Drawing Sheets

U.S. PATENT DOCUMENTS

| | | | |
|---|---|---|---|
| 4,938,605 A * | 7/1990 | Friedrich | 366/76.2 |
| 5,146,831 A * | 9/1992 | Fetter et al. | 83/698.41 |
| 5,435,714 A * | 7/1995 | Van Lengerich et al. | 425/313 |
| RE35,027 E * | 8/1995 | Ragard | 29/740 |
| 5,450,777 A * | 9/1995 | Molnar et al. | 83/98 |
| 5,879,278 A * | 3/1999 | Cox | 493/67 |
| 5,888,558 A * | 3/1999 | Janot et al. | 425/313 |
| 6,694,850 B1 * | 2/2004 | Tosatto | 83/337 |
| 7,530,806 B2 * | 5/2009 | Pinchot | 425/142 |
| 2007/0087070 A1 * | 4/2007 | Ouellette | 425/313 |

FOREIGN PATENT DOCUMENTS

| | | |
|---|---|---|
| DE | 25 57 166 | 2/1977 |
| WO | 01/03900 | 1/2001 |

* cited by examiner under high pressure extrusion develops in the radial bores and is blown out radially by the extruder pressure, before being cut by the fork provided with knives.

APPARATUS FOR CUTTING DUCTILE MATERIALS AND A METHOD OF OPERATING THE APPARATUS

BACKGROUND OF THE INVENTION

The present invention refers to an apparatus for cutting ductile materials, particularly for chopping plastic materials processed in an extruder or in a mixing and kneading apparatus. The cutting apparatus comprises a nozzle having a plurality of outlet openings separated from each other by separator webs. A cutting tool is adapted to be driven to a rotational movement. It has a plurality of cutting knives for cutting off material strands discharged through the outlet openings of the nozzle, and a drive assembly is provided for driving the cutting tool.

Moreover, the present invention also refers to a method of operating such a cutting apparatus.

A cutting apparatus of this kind is primarily used for chopping plastic material processed in an extruder and discharged therefrom.

PRIOR ART

Known in the art are cutting apparatuses in the field of granule manufacturing in which knives are moved along so-called nozzle plates to cut the discharged product strands into small pieces having a shape as uniform as possible, i.e. the granules. Furthermore, there are applications in the processing industry for plastic materials, particularly in the subsequent processing for manufacturing foil-like products, e.g. calendars, rolling mills etc. in which also strands of material have to be cut.

In plants for manufacturing granules, moreover, cutting apparatuses are known in which the knife shaft is arranged both centrically with regard to the so-called nozzle plate and eccentrically with regard to the so-called nozzle plate. However, in both cases, the knife shaft is driven to an even, steady rotational movement and can be adjusted as far as its angular velocity is concerned for setting the length of the product pieces to be cut off.

On the other hand, cutting apparatuses are known in which a cutting tool is moved along the nozzle opening in a translatory movement. Driven are these cutting tools either by pneumatically operated drive cylinders or by an eccentric gear assembly.

A common task to be performed by all known cutting apparatuses is that they have to produce cleanly cut-off product pieces, independently of the material throughput and of the consistency of the material. If the material throughput is changed, the rotational speed of the cutting tool is adjusted in apparatuses that are based on rotary cutters in order to keep the length of the cut-off pieces constant. In other words, at low throughput rates, lower rotational speeds and, thereby, lower cutting speeds are realized.

If the cutting speed falls below a certain lower limit value, which is dependent on the viscoelasticity of the product to be cut, the quality of the cut worsens; in the worst case, a crushing-off or squeezing-off of the product piece can result. The obtained pieces of material, which are substantially deformed, interfere with the further processing of the product insofar as they show declined free flow properties, worse meterability as well as an impaired conveying behavior. Moreover, these deformed pieces favor an agglomeration, sometimes fully preventing a further processing and leading from an impaired meterability to a blocking of a subsequent conveying device.

Pneumatically driven, translatory cutting apparatuses allow to keep a feasible cutting speed. To maintain a predetermined length of the piece to be cut off, the stop period between two cutting operations is adjusted in dependence of the material throughput. However, problems can arise if high throughput rates are to be realized. The stop periods, in this case, approach zero, and the cutting frequency is limited by the rated load-cycle change value of the pneumatic drive unit. These limitations regarding useful life and performance have resulted in a substantial decrease of practical applications of such cutting apparatuses.

The translatory cutting apparatuses driven by an eccentric gear show symptoms similar to the ones of the well known rotating cutting devices. Upon reducing the material throughput, the rotation speed of the drive unit is reduced accordingly to keep the length of the cut off pieces constant. The result is a corresponding reduction of the cutting speed. Moreover, the eccentric gear drive is relatively large, thus limiting its use in tight spaces and/or impairing its accessibility. The same is true for the rotating cutting apparatuses in which the knife shaft is eccentric with regard to the central longitudinal axis of the nozzle.

Taking into account the problem of insufficient cutting speed at low throughput rates, known cutting apparatuses use a lower number of cutting tools than product discharge openings are present in the nozzle, because the cutting speed would be lowered even more adding further cutting tools. However, if there are more product discharge openings than cutting tools, a damming and subsequent product agglomeration is observed because the individual product strands are cut sequentially by the cutting tool. The result of such an agglomeration is that further processing is substantially impaired.

A further disadvantage of known cutting apparatuses is the occurrence of material discharged by the nozzle being pressed against the surfaces of the cutting tool facing the nozzle. The slower the cutting speed, the more intensive and the longer is the extruded material pressed against the cutting tool. The forces occurring thereby can result in a permanent deformation of the cutting tool. In the case of thermally sensible plastic materials (for example polyvinyl chloride, PVC) that are often processed in extruders and subsequently cut into granules, this pressing on can result in material deposits at the surface of the cutting tool. After a short period of time, a build-up of a layer is observed and a thermal degradation reaction starts. Particles of such marred deposits can become lose and contaminate the product to be processed further. In order to avoid such contamination, the continuously running cutting operation has to be stopped and the critical zone has to be cleaned. Such a break causes an interruption of the entire manufacturing process; in the case of calendar plants, the break can last up to several hours and involves substantial financial losses.

The document DE-A-196,31,182 discloses a granulating apparatus for various materials, especially plastics or foodstuffs. The granulating apparatus is arranged subsequent to an extruder and comprises a hollow cylindrical housing closed at the end, provided with a plurality of radially extending bores through which the material to be granulated is discharged. In order to provide for an even distribution of the material, planet roller spindles are arranged in the interior of the housing. At the outside of the housing, two rotating knives are provided which are held in a fork and by means of which the molten strands discharged through the bores are cut. The length of the cut-off granule particles is determined by the rotation speed of the fork and by the discharge speed of the molten material. Besides having the herein before mentioned disadvantages, the danger exists in such an apparatus that crumbly product particles can be thrown by the centrifugal acceleration of the cutting tools into the gap between the rotating knives and the outer side of the housing, possibly leading to a blocking of the drive unit.

The document EP-A-1,108,509 discloses an extrusion apparatus for extruding plastic material, having at its outlet side a discharge unit provided with knives. The extrusion apparatus comprises in conventional manner a worm gear with a rotating worm shaft provided with worm toothing. At the end of the worm gear, the tip of a cylinder is located, delimiting an annular discharge opening of the discharge unit. Within this discharge opening, stationary knives are provided, whereby outlet passages are left between the knives through which the plasticized plastic material can be discharged. The toothing of the worm shaft, rotating with reference to the stationary discharge unit, wipe off the discharged plastic material at these knives to produce material strand sections.

The document U.S. Pat. No. 3,029,466 discloses a pelleter for thermoplastic plastic materials, having a coolant tank placed on its top. The pelleter is provided with a nozzle plate. Through the nozzles of the nozzle plate, liquid resin can be axially discharged into the coolant tank. The discharged resin immediately solidifies in the coolant. For cutting off pieces of the discharged material strands, a knife head with cutting knives is provided, to be operated in two different modes of operation. In one mode, the knife head rotates whereby the rotation speed is variable. The knives provided for this mode of operation are equipped with cutting edges only on one side. In the other mode of operation, the knife head performs an oscillating movement, i.e. back and forth. The knives provided for this mode of operation are equipped with cutting edges on both sides in order to be able to cut the resin discharged through the nozzle plate in both senses of rotation.

The document U.S. Pat. No. 5,888,558 discloses an apparatus for extruding a food product substance and for cutting the extrudate from a die of an extrusion head of the extruder into pieces. It has a rotary shaft and a knife which is affixed to the shaft and which has two blades. Each blade has a cutting edge, wherein the two blades are offset one from another so that one blade extends from the axis of shaft rotation for a distance from the shaft rotation axis for a distance greater than that of the other blade. The shaft and blades and the blade cutting edges are configured and positioned with reference to the extrusion head. Each die is positioned so that upon exit of extrudate from each die and upon rotation of the shaft, one blade cutting edge cuts and incises a part of the extrudate substance and the other blade cuts the extrudate substance to obtain a cut piece so that the cutting by the two blades provides a cut piece having an incised part. Particularly, it is mentioned that the shaft driving the cutting device shall rotate at 2000 rpm if the discharge rate amounts to 300 kg/h.

The document DE 25 57 166 discloses an extruder with a horizontally extending cylinder and a rotating worm disposed therein. At the outlet of the cylinder, a granulator is located whose longitudinal axis runs in vertical direction. In the transition area between cylinder and granulator, there is provided a deflector plate having a number of passages. In the interior of the granulator, an axially symmetric inner surface is provided into which radially extending nozzles open. Moreover, a knife is provided, rotating in front of the axially symmetric inner surface. For cooling down the extruded plastic material, cooling water is fed through the granulator. By means of the knife, the plastic strands discharged through the nozzles are cut off and separated into small balls.

The document U.S. Pat. No. 3,874,835 discloses a combined cutter configuration and die plate. The cutter has a plurality of blades projecting radially from a cylindrical body and extending longitudinally therealong. At the free end of each blade is a cutting edge that is operatively associated with the downstream side of the die plate, so that upon rotation of the cutter, heat-plastified material extruded through the orifices of the die plates is sheared into pellets. Adjacent pairs of blades on the cutter and the intervening body portion establish continuous longitudinally extending channels into which the newly sheared pellets collect. Where the blades are helically arranged on the body of the cutter, rotation of the cutter in one direction causes the blades to appear to advance in one axial direction. By supplying a stream of a pellet-treating fluid to a chamber enclosing the cutter and causing such fluid to flow in one helical direction, pellets are sheared sequentially in this direction along longitudinal lines of the die plate permitting the treating fluid to flush through the helical channels formed between the cutter blades and the die plate, and to sweep each pellet from the cutting edge of a blade as the plastic is cut into a pellet. The cut pellets can be collected at the downstream end of the cutter.

The document U.S. Pat. No. 5,435,714 discloses an apparatus and a method for the production of three-dimensional food products such as crackers, cookies, puffed snacks, glassy half-products which are expandable upon subsequent heating, ready-to-eat cereals, confections, pasta, and pet foods on a mass production basis. A farinaceous-based dough or confectionery composition is fed to a plurality of dies which shape the food composition into at least one shape conforming to the orifices of the dies. The shaped extrudate rope obtained from each die is cut by a first cutting means which passes across only a portion of each of the orifices of the dies. The first cutting means thus only partially cuts each of the shaped extrudate ropes. Second cutting means pass across the entire orifice of each of the dies to completely cut each of the partially cut extrudate ropes into individual pieces. The dough or confectionery pieces which are obtained are three-dimensional in that they are partially cut at an angle transverse to the direction of extrusion.

Finally, the document DE-A-101,37,525 discloses an apparatus for granulating thermoplastic plastic materials discharged through nozzles. The apparatus is provided with a nozzle plate in which are formed a plurality of nozzles running in axial direction, i.e. parallel to the longitudinal central axis of the apparatus, through which the plastic material to be granulated is discharged in liquid form. Opposite to the nozzle plate, a rotating annular plate is located which is provided with knives wiping off the nozzle plate in known manner in order to cut the plastic material strands discharged through the nozzles. The annular plate is supported on a bell-shaped knife support member. For cooling the granules cut off by the rotating knives, cooling water is fed to the interior of the rotating knife support member.

OBJECTS OF THE INVENTION

It is an object of the present invention to provide an apparatus for cutting ductile materials, particularly for chopping plastic materials processed in an extruder or in a mixing and kneading apparatus, in which the length of the pieces to be cut off can be set independently of the discharge rate of the material to be cut and also independently of rotating speed of the cutting knives.

It is a further object of the present invention to provide an apparatus for cutting ductile materials, particularly for chopping plastic materials processed in an extruder or in a mixing and kneading apparatus, in which a clean cut of the pieces is ensured, independent of the discharge rate of the material to be cut and also independent of the rotating speed of the cutting knives.

It is a further object of the present invention to provide an apparatus for cutting ductile materials, particularly for chopping plastic materials processed in an extruder or in a mixing and kneading apparatus, in which any formation of aggregates during the cutting process is avoided and in which a blocking of rotating elements by cut off pieces is substantially prevented.

It is a further object of the present invention to provide an apparatus for cutting ductile materials, particularly for chopping plastic materials processed in an extruder or in a mixing and kneading apparatus, in which no material deposits at the surface of the cutting knives and of the nozzle plate can occur, thereby avoiding any contamination and deterioration of the final product.

It is a further object of the present invention to provide an apparatus for cutting ductile materials, particularly for chopping plastic materials processed in an extruder or in a mixing and kneading apparatus, which requires only a small space and is easy to set up.

Finally, it is an object of the invention to provide a method of operating a cutting apparatus comprising a nozzle having a plurality of outlet openings separated from each other by separator webs, a cutting tool adapted to be driven to a rotational movement and having a plurality of cutting knives for cutting off material strands discharged through the outlet openings of the nozzle, and a drive unit adapted to drive the cutting tool to an intermittent rotational movement.

SUMMARY OF THE INVENTION

In order to meet these and other objects, the present invention provides an apparatus for cutting ductile materials, particularly for chopping plastic materials processed in an extruder or in a mixing and kneading apparatus, comprising a nozzle having a plurality of outlet openings separated from each other by separator webs, a cutting tool adapted to be driven to a rotational movement and having a plurality of cutting knives for cutting off material strands discharged through the outlet openings of the nozzle, and a drive unit adapted to drive the cutting tool to an intermittent rotational movement, thereby moving each of the cutting knives from a first position behind a first of the separator webs to a second position behind a second, adjacent separator web, whereby the width of the separator webs is at least equal to the width of the cutting knives.

The present invention also provides a method of operating a cutting apparatus comprising a nozzle having a plurality of outlet openings separated from each other by separator webs, a cutting tool adapted to be driven to a rotational movement and having a plurality of cutting knives for cutting off material strands discharged through the outlet openings of the nozzle means, and a drive unit adapted to drive the cutting tool to an intermittent rotational movement. The method comprises the step of intermittently moving each of the cutting knives from a first position behind a first separator web to a second position between a second, adjacent separator web, whereby the movement of the cutting knives is stopped for a predetermined time period when the cutting knives are behind the separator webs.

Due to the facts that the separator webs are at least as wide as the cutting knives, the cutting tool is intermittently moved for performing a cutting operation, and the cutting knife rests behind a separator web before it is moved to a position behind an adjacent separator web to perform a cutting operation, a substantially higher flexibility in operation is achieved and all the disadvantages mentioned herein before are avoided. The expression "intermittently moved" shall mean, in this context, that the cutting tool is rotated along a predetermined angular path and subsequently stopped for a certain period of time. During that time period in which the cutting tool is at standstill, the product can be discharged through the nozzle by a certain amount without having any contact with the cutting tool. The period of time during which the cutting tool is at standstill is usually longer than the time period required for moving a cutting knife from a position behind one separator web to a position behind a subsequent separator web, i.e. to perform a single cutting operation.

The main advantage of the cutting apparatus according to the present invention consists in the fact that the length of the piece to be cut off is determined by the length of the time period of standstill of the cutting tool and not by the cutting speed and the discharge rate of the material to be cut. Moreover, the cutting speed can be adjusted independently of the discharge rate of the material to be cut off in such a way that a clean cut is achieved with material of any consistency. The danger of squeezing off the material due to insufficient cutting speed is thereby avoided. For example, if the discharge rate is low, the cutting tool remains longer in its rest position behind the separator webs than at a high discharge rate, if the length of the pieces to be cut off should remain constant.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
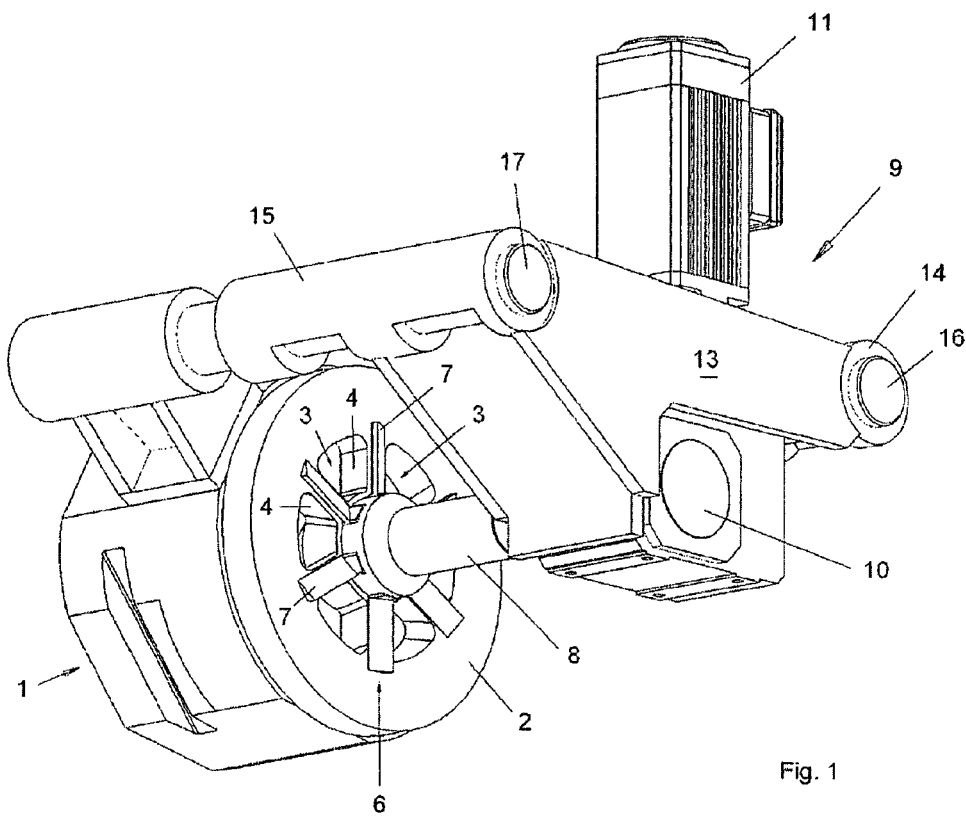
FIG. 1 shows a perspective view of a schematically shown cutting apparatus.

With reference to FIG. 1, the basic design of the cutting apparatus will be further explained. The cutting apparatus comprises a nozzle member, generally designated with reference numeral 1, the nozzle member being located usually at the outlet of a processing machine, for example an extruder or a mixing and kneading apparatus. The processing machine, being well known to a person skilled in the art, is not shown in the drawings. At the outlet side of the nozzle member 1, there is provided a nozzle plate 2. Its front face runs perpendicular to the longitudinal axis L of the nozzle member 1. The nozzle plate 2 comprises a plurality of outlet openings 3 each having a longitudinal axis Z running parallel to the longitudinal axis L of the nozzle member 1. The product processed in the (not shown) processing machine is discharged axially through the outlet openings 3. The individual outlet openings 3 are separated from each other by means of separator webs 4.

Next to the nozzle plate 2, as seen in the direction of material discharge, a cutting tool 6 is located, provided with several knives 7 arranged in a propeller-like array. The cutting tool 6 is mounted on a rotating drive shaft 8 connected to a drive unit 9. The drive shaft 8 is supported in the nozzle plate 2 by means of a floating bearing (not shown in FIG. 1) in such a way that the rotational axis of the cutting tool 6 runs coaxial with the central longitudinal axis of the nozzle 1. For intermittently driving the cutting tool 6, a programmable control unit and a drive unit 9 is provided. The drive unit 9 comprises, as shown in FIG. 1, a gear box assembly 10 and an electric motor 11. For example, the drive unit 9 can be designed as programmable servo motor-gear box combination, known under the expression stepping motor drive, or an electric motor-stepping gearbox combination, e.g. a so-called "Maltese Cross gear box".

The width of an individual knife 7 is matched to the width of a separator web 4 such that each knife 7 is covered in axial direction by a separator web 4 if the apparatus is in its rest position shown in FIG. 1. In this way, the knives do not interfere with the product flow discharged by the outlet openings 3.

The entire drive unit 9 is suspended on a supporting frame 13 that is, in turn, supported by means of two guide members 14, 15 on two guiding pillars 16, 17.

Figure 2:
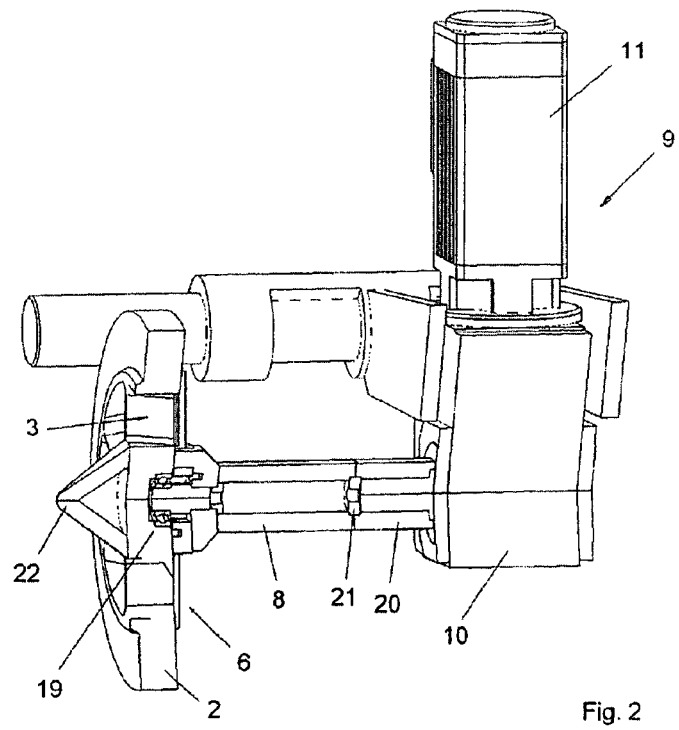
FIG. 2 shows a longitudinal sectional view of the apparatus of FIG. 1.

In FIG. 2, the cutting apparatus according to FIG. 1 is shown in a longitudinal sectional view, taken through the cutting tool 6 and the nozzle plate 2. In this view, it is particularly obvious that the drive shaft 8 is supported in the nozzle plate 2 by means of a floating bearing 19, and also that the drive shaft 8 is a multipart design. Particularly, the drive shaft 9 comprises a shaft portion 20 coupled to the gear box assembly 10 which is coupled to the real drive shaft 8 by means of a jaw clutch 21. In order to be able to remove the cutting tool 6, the supporting frame 13, together with the drive unit 9, has to be moved away from the nozzle plate 2 along the guiding pillars 16, 17 by an amount corresponding to the depth of the floating bearing 19 in the nozzle plate 2 plus the length of the clutch 21 between shaft portion 20 and drive shaft 8. A removal of the cutting tool 6 may be required, for example, in order to clean it or to exchange it. At the inlet side of the nozzle plate 2, there is provided a conical guide member 22 which redirects the product flow towards the outlet openings 3.

By supporting the drive shaft 8 directly in the center of the nozzle plate 2, an exact guidance of the cutting tool 6 and the knives 7 along the front face of the nozzle plate 2 is ensured. Due to the fact that the entire cutting apparatus is movable and lockable in a direction parallel to the longitudinal axis of the nozzle 1, the distance between the cutting edges of the knives 7 and the surface of the nozzle plate 2 is exactly adjustable and it is ensured that the cutting tool 6 can be removed or replaced quickly and easily.

Figure 3:
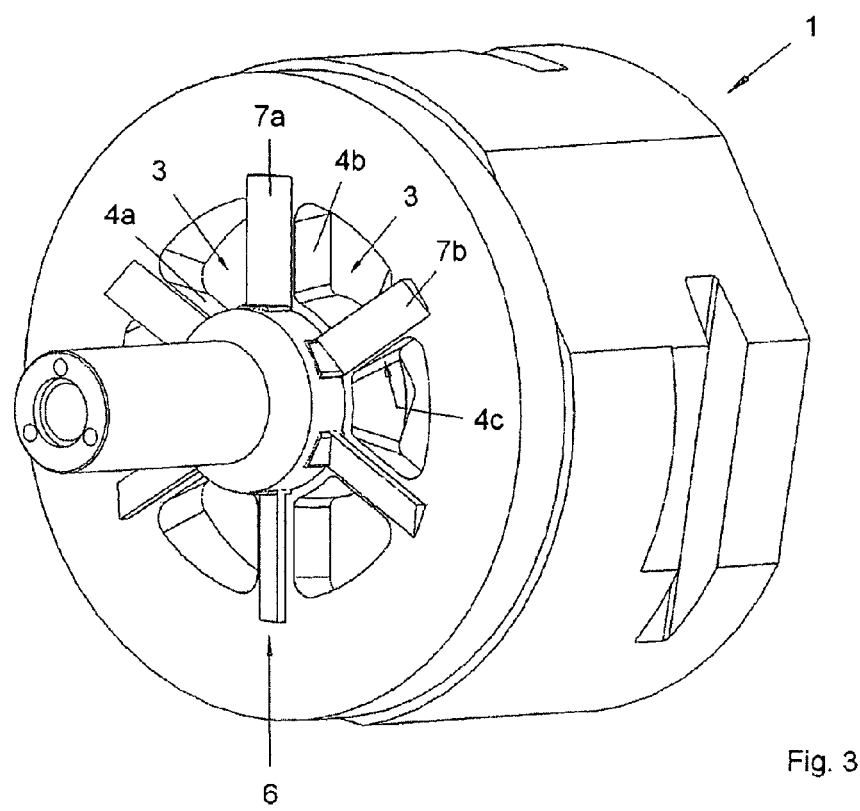
FIG. 3 shows an enlarged perspective view of the nozzle and the cutting tool in its rest position.

FIG. 3 shows the nozzle 1, together with the cutting tool 6, in an enlarged view. The cutting tool 6 is in its rest position, i.e. the individual knives 7a, 7b are covered by the corresponding separator webs 4b, 4c, as seen in axial direction, i.e. in a direction of the longitudinal axis of the nozzle 1; thus, the knives 7a, 7b do not impede the product flow axially discharged out of the outlet openings 3. It is to be noted that the axially discharged product flow is not shown in this drawing. The expression "rest position" shall mean that the cutting tool 6 is at stand-still, i.e. the cutting tool 6 is not rotated, but stops in that rest position until a new cutting operation has to be performed.

Figure 4:
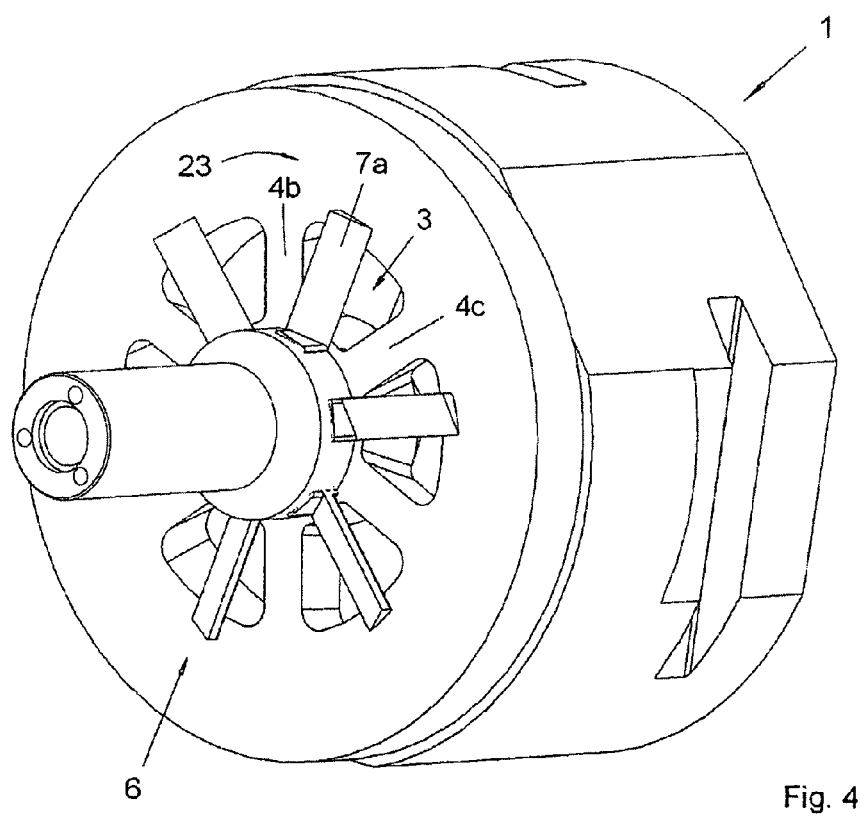
FIG. 4 shows an enlarged perspective view of the nozzle and the cutting tool in its operating position.

FIG. 4 shows a view of the cutting apparatus similar to FIG. 3, but with the cutting tool 6 in its operating position. In order to cut off the individual strands of material axially discharged through the outlet openings 3, the cutting tool 6 is rotated in the direction of the arrow 23 such that the knives 7 move from one separator web 4 to the next one. In the present example, the nozzle 1 comprises a total of six outlet openings 3 and six separator webs 4 and, consequently, the cutting tool 6 comprises six knives 7. In order to move, for example, the knife 7a from the separator web 4b to the adjacent separator web 4c, as seen in the direction of the arrow 23, the cutting tool 6 has to be rotated by 360° divided by the number of webs (6), namely 60° (i.e. 360°/6=60°). The total number of the knives 7 and the number of separator webs 4 can be preferably between three and eight. It may be advantageous if the separator webs 4 are somewhat wider than a knife 7 such that the knife 7 can be accelerated, upon starting an individual cutting operation, along the available path behind the separator web 4 already to the required minimum cutting speed.

The total time required for an individual cutting operation, i.e. the time period from starting the acceleration of the knife behind the one separator web until its stop behind the subsequent separator web, usually amounts to between 0.05 and 0.2 seconds. It is understood that the above mentioned value merely is to be considered as a guide value; depending on the product, viscosity, discharge rate etc., this value can vary to a considerable degree. However, it is important that, on the one hand, the individual knives 7 are accelerated quickly up to the required cutting speed and, on the other hand, that the cutting speed is relatively high in order to ensure that the axial force exerted on the knife 7 by the axially discharged product strand remains low. In a quickly performed cutting operation, the knives are axially loaded only to a minor extent by the discharged product strand, with the result that the danger of any accumulation and precipitation of material on the knives is very low. Moreover, the cutting tool 6 can be designed in a slim shape due to the low axial load, improving the cutting behavior because the knife meets a lower resistance during the cutting operation.

Due to the fact that a separate cutting knife is assigned to each outlet opening, all discharged product strands are cut off simultaneously when the cutting tool 6 is rotated. Any adhering of the product pieces to each other, as it may be observed with cutting apparatuses of the prior art, is thereby avoided.

In an alternative embodiment of the cutting apparatus, not shown in the drawings, it may be provided that the longitudinal axes of the outlet openings run in radial direction relative to the longitudinal axis of the nozzle. In other words, the outlet openings are provided in the cylindrical jacket of the nozzle. Also in this case, the axis of rotation of the cutting tool runs coaxially with the longitudinal axis of the nozzle; the knives, however, move along a circular path along the cylindrical jacket of the nozzle.

In another embodiment, it is possible to drive the cutting tool 6 to a reciprocating movement rather than a rotating movement. In other words, after having moved from one separator web 4 to the subsequent one, the direction of movement of the knives 7 is reversed such that the knives 7 move back to the former separator web 4. In this case, it is understood that the knives 7 have to be provided with a cutting edge on both opposite sides in order to ensure that the product strands discharged from the outlet openings 3 are cut by the particular knife in both directions of rotation.

What is claimed is:

1. An apparatus for cutting ductile materials discharged from an outlet of a processing machine, said cutting apparatus comprising:
   a nozzle connectable to the outlet of the processing machine and having a plurality of outlet openings separated from each other by separator webs, each separator web having a first width;
   a cutting tool adapted to be driven to a rotational movement and having a plurality of cutting knives for cutting off material strands discharged through said outlet openings of said nozzle, each cutting knife having a second width; and drive means adapted to drive said cutting tool to an intermittent rotational movement in which the cutting knives are stopped for a predetermined period of time during a complete revolution before moving each of said cutting knives from a first position behind a first of said separator webs to a second position behind a second, adjacent separator web;

said first width of said separator webs being at least equal to said second width of said cutting knives; and said drive means including a programmable motor/stepping gear box combination configured to permit adjustment of said predetermined time period between two intermittent rotational movements of the cutting tool and/or the cutting speed independent of the discharge rate of the material strands discharged through said outlet openings.

2. An apparatus according to claim 1 in which said nozzle comprises at least three of said separator webs for separating said outlet openings from each other, said cutting tool having a corresponding number of cutting knives and being driven by said drive means to an intermittent rotational movement along an angle of 360° divided by the number of separator webs.

3. A cutting apparatus according to claim 1 in which said nozzle comprises between three and eight of said separator webs for separating said outlet openings from each other, said cutting tool having a corresponding number of cutting knives and being driven by said drive means to an intermittent rotational movement along an angle of 360° divided by the number of separator webs.

4. A cutting apparatus according to claim 1 in which the longitudinal axes of said outlet openings run essentially parallel to the longitudinal axis of said nozzle, in which said separator webs extend essentially perpendicular to said longitudinal axis of said nozzle, and in which the axis of rotation of said cutting tool runs essentially coaxial with said longitudinal axis of said nozzle.

5. A cutting apparatus according to claim 1 in which said nozzle comprises a nozzle plate member in which said outlet openings are provided, whereby said cutting tool is rotatably supported in the center of said nozzle plate member.

6. A cutting apparatus according to claim 5 in which said cutting tool is supported in the center of said nozzle plate member by means of a floating bearing and is axially movable with relation to said nozzle plate member.

* * * * *